United States Patent Office 3,661,804
Patented May 9, 1972

3,661,804
LEAD DIOXIDE STABILIZATION
Klaus L. J. Scholz, Konigsbrunn, and Josef Psader, Neusass, Germany, assignors to Polychemie G.m.b.H. Augsburg, Augsburg, Germany
No Drawing. Filed Apr. 3, 1970, Ser. No. 25,569
Claims priority, application Germany, Apr. 18, 1969, P 19 19 803.9
Int. Cl. B01j 11/78
U.S. Cl. 252—441      5 Claims

ABSTRACT OF THE DISCLOSURE

Stabilization of the oxidizing capacity of lead dioxide to prevent acceleration thereof caused by heat which is obtained by the addition of 0.1 to 15% by weight, based on the lead dioxide, of a multivalent metal salt wherein the metal is tin, zinc, cadmium, nickel, cobalt, manganese, iron, chromium, bismuth, vanadium, tungsten or molybdenum.

STATE OF THE ART

Lead dioxide is offered by manufacturers with various oxidation reactivities which oxidation reaction rate will remain constant or only slightly changed when stored under normal conditions even for prolonged periods of time. Lead dioxide in paste form has been extensively used in the sealing art as an oxidizing agent in the vulcanization of polysulfide polymers. To harden the sealing mass, the polysulfide polymer and the necessary amount of lead dioxide paste are thoroughly admixed shortly before use and a workable pot life can be obtained by the addition of suitable catalysts.

The problem arises due to the fact that the lead dioxide oxidation rate is stable only over a relatively narrow temperature range and storage of the lead dioxide at summer temperatures, for instance, subject the lead dioxide to heat stress. Exposure of even a short duration to moderately elevated temperatures results in irreversible accelerated reactivity of lead dioxide. Rapid vulcanizing of the polysulfide sealing compositions containing lead dioxide hardener, affected by the accelerated reactivity of lead dioxde, can progress so far that further processing of the valuable sealing composition is no longer possible and the sealing composition is thus discarded. Exposure of lead dioxide to sudden and extreme heat stresses can lead to such uncontrollable reaction rates that the polysulfide polymer composition containing lead dioxide will harden during mixing of the polysulfide polymers and lead dioxide.

In reference to other fields of use where lead dioxide is used as an oxidizing agent, the uncontrollable acceleration of its reaction rate is also a great handicap.

The use of lead dioxide of a specific lower or less reactivity which depends on its process of preparation had to be selected and with some of the processes, lead dioxide having long reaction times was produced. Although thermal effect on reactivity of lead dioxide was not eliminated, the accelerated reaction rate resulting from thermal effects produced reaction rates which were just tolerable. There resulted a practice of manipulating summer and winter grades of polysulfide polymers, as is noted in technical literature, in order to reduce the defect ratio to a reasonable degree.

It is also known that a temporary thermal stability of the lead dioxide reactivity can be attained with satisfactory results with the addition of stearic acid or other organic acids. The disadvantage of this approach is a simultaneous considerable reduction of the reaction rate. If this reaction rate is increased to a normal level by other catalysts, rapid hardening of the polysulfide polymer composition again takes place when the composition is subjected to heat for a short duration.

OBJECTS OF THE INVENTION

It is an object of the invention to stabilize against thermal effects the oxidizing property of lead dioxide by addition of an anti-oxidant multivalent metal salt of a mineral acid, or a mixture of such salts.

It is another object of the invention to reduce and prevent acceleration of the oxidizing capacity of lead dioxide by addition from 0.1% to 15%, based on lead dioxide, of a multivalent metal salt of a mineral acid, or a mixture of such salts in order to obtain a suitable pot life of a polysulfide polymer composition containing lead dioxide.

Another object of the invention is the addition of a sufficient amount of a multivalent metal halide salt to reduce and inhibit acceleration of the oxidizing capacity of lead dioxide which is caused by exposure of lead dioxide to moderately elevated and to elevated temperatures without affecting preparation of the various lead dioxide containing compositions, especially sealing compositions.

These and other objects and advantages of the invention will become obvious from the following detailed description.

This invention relates to stabilization of lead dioxide against heat induced acceleration of its oxidizing property.

In accordance with the invention described herein, acceleration of oxidizing property of lead dioxide is inhibited by addition to lead dioxide from 0.1% to 15%, based on lead dioxide, of an antioxidant multivalent metal salt of a mineral acid, or a mixture of such salts, preferably hydrohalides.

In a preferred embodiment, the amount of the halogen salts to be used varies from 0.5% to 5%. Suitable multivalent metal ions which can form secondary valences include tin, zinc, cadmium, nickel, cobalt, manganeses, iron, chromium, bismuth, vanadium, tungsten, and molybdenum. The preferred metal ions are tin and zinc. Examples of the mineral acids are sulfuric acid, hydrochloric acid, phosphoric acid, hydrobromic acid, hydrofluoric acid, hydroiodide acid, etc.

It is non-essential at what stage of lead dioxide preparation the herein described halide salts are added. Preparation of the stabilized lead dioxide may be accomplished by simply mixing powdered lead dioxide with the halide salts.

Stabilization of the oxidizing property of lead dioxide is particularly effective with anhydrous halide salts. However, halide salts which contain water, especially water of crystallization will also provide sufficient stabilization. Since compositions containing lead dioxide must be stable for a longer period of time, the use of salts which undergo hydrolysis is not recommended since the resulting strong acids create other problems. The use of such salts is not recommended for practical, not theoretical, reasons.

Although the use of halide salts of such metals as cadmium, manganese, nickel, cobalt iron, chromium, bismuth, vanadium, tungsten and molybdenum may produce coloration of lead dioxide, depending on the concentration of the salt in the composition, these salts impart the desired stabilizing effect on lead dioxide.

Retardation of the reaction rate of thermally activated lead dioxide can be easily determined by measuring the pot life of a composition, i.e., time duration during which the composition can be worked. With polysulfide rubber masses, a pot life of at least one-half hour is required and a pot life shorter than one-half hour is insufficient. Sudden heat stresses can lead to very rapid, uncontrollable reaction rates whereby the polysulfide mass hardens during the mixing.

Addition of halide salts of multivalent metal ions does not affect the reaction rate of lead dioxide in polysulfide rubber compositions by changing the pot-life time. Addition of the halide salts can impede and prevent heat aging of lead dioxide resulting in increased reaction rates without leading to any disadvantages in preparation and function of the compositions containing lead dioxide.

The following examples are illustrative of the invention described herein but they are not to be construed as being restrictive in any sense. It should be understood that any other conventional additives can be added to improve the quality of the composition.

EXAMPLE I

Commercial grade lead dioxide of HCl type was stabilized by addition of 4% zinc chloride based on lead dioxide. Heat aging of polysulfide sealing mass took place at 50° C. and the pot life was determined on the basis of the exposure time to the temperature of 50° C. Composition of the polysulfide sealing mass was as follows:

| Component I: | Percent |
| --- | --- |
| Polysulfide mass | 35 |
| Plasticizer | 21 |
| Catalyst | 2 |
| Inert fillers | 42 |
| Component II: | |
| Lead dioxide | 31 |
| Plasticizer | 39 |
| Inert fillers | 23 |
| Catalyst | 7 |

Component I is mixed with component II in a ratio of 10:1.

Pot life of unstabilized lead dioxide was determined at the same time for comparison purposes.

TABLE I

| Duration of heat aging at 50° C. | Stabilized $PbO_2$, min. | Unstabilized $PbO_2$, min. |
| --- | --- | --- |
| 3 days | 32 | 31 |
| 1 week | 50 | 17 |
| 5 weeks | 70 | 10 |
| 10 weeks | 40 | 5 |

As is evident from the above table, the stabilizing effect of zinc chloride is considerable. Heat aging of the unstabilized $PbO_2$ sealing mass at 50° C. for one week leads to such irreversible reaction acceleration that a breakdown of the polysulfide sealing mass results and pot life is reduced to less than 30 minutes.

EXAMPLE II

Lead dioxide of the type HC3 was stabilized against heat aging by admixing with 4% of stannous (tin-II) chloride, based on the lead dioxide. The pot life of the polysulfide sealing mass was determined in the same manner as in Example 1, with the following results:

TABLE II

| Duration of heat aging at 50° C. | Stabilized $PbO_2$, min. | Unstabilized $PbO_2$, min. |
| --- | --- | --- |
| 3 days | 63 | 75 |
| 2 weeks | 51 | 35 |
| 5 weeks | 64 | 42 |
| 8 weeks | 45 | 27 |

The polysulfide mass had the same composition as in Example I. The HC3 lead dioxide is somewhat more stable than the lead dioxide used in Example I but not sufficiently heat stable by itself as can be seen from Table II.

EXAMPLE III

HC3 type lead dioxide was stabilized with 4% of stannic (tin–IV) chloride, based on lead dioxide. The pot life of the polysulfide sealing mass, of the same composition as in Example I was determined as in Example I, with the following results:

TABLE III.—POT LIFE

| Duration of heat aging at 50° C. | Stabilized $PbO_2$, min. | Unstabilized $PbO_2$, min. |
| --- | --- | --- |
| 3 days | 90 | 75 |
| 2 weeks | 60 | 35 |
| 5 weeks | 59 | 42 |
| 8 weeks | 77 | 27 |

Various modifications of the compositions of the invention may be made without departing from the spirit or scope thereof.

EXAMPLE IV

Several salts of the compounds described above were mixed together. The stabilizing effect of these mixtures in stabilizing $PbO_2$ against heat aging was compared. The values obtained are given in the following table: The heat aging was carried out at 50° C.

TABLE IV

| | $C^+$, percent | Potlife (determined in minutes) heat aging at 50° C. | | | |
| --- | --- | --- | --- | --- | --- |
| | | At the beginning | 2 weeks | 3 weeks | 5 weeks |
| Ferric-phosphate | 5 | 150 | 150 | 180 | 170 |
| Ferrous-sulfate | 5 | 140 | 140 | 130 | 120 |
| Chromic-chloride | 5 | 145 | 150 | 155 | 150 |
| Cobalt nitrate | 2 | 140 | 135 | 60 | 60 |
| Nickel carbonate | 2 | 190 | 90 | 30 | 25 |
| Mangan-II-sulfate | 2 | 190 | 150 | 150 | 120 |
| Cadmium chloride | 2 | 155 | 160 | 155 | 120 |
| Molybdenous sulfate | 0.5 | 180 | 150 | 135 | 120 |
| Zinc chloride | 0.5 | 190 | 160 | 150 | 120 |

NOTE.—$C^+$=concentration based upon $PbO_2$.

We claim:

1. A composition consisting essentially of lead dioxide and a stabilizing quantity, in sufficient amount to inhibit heat-induced acceleration of the oxidizing capacity of lead dioxide, of at least one multivalent metal salt of a mineral acid wherein the metal salt is a halide, sulfate, carbonate, phosphate or nitrate of a metal selected from the group consisting of tin, zinc, cadmium, nickel, cobalt, manganese, iron, chromium, bismuth, vanadium, tungsten and molybdenum.

2. A composition of claim 1 wherein said stabilizing quantity is in the range of 0.1% to 15%, based on lead dioxide.

3. A composition of claim 1 wherein said multivalent metal ion is selected from the group of metal ions consisting of tin and zinc.

4. Composition of claim 1 wherein said stabilizing quantity is in the range of from 0.5% to 5%, based on lead dioxide.

5. A composition of claim 1 wherein the halide is chloride.

References Cited
UNITED STATES PATENTS 3,243,403  3/1966  Vondy et al. _____ 260—79 X
3,282,902  11/1966  Panek _____ 260—79 X
3,477,962  11/1969  Kardys _____ 252—440 X
3,555,102  1/1971  Ogura et al. _____ 252—441 X PATRICK P. GARVIN, Primary Examiner U.S. Cl. X.R.

252—437, 438, 440, 443; 260—79